United States Patent Office

Re. 25,811
Reissued June 29, 1965

25,811

PREPARATION OF VINYL ESTERS OF PHOSPHORUS ACIDS [USEFUL AS INSECTICIDES]

Charles H. Tieman and Alan R. Stiles, Modesto, Calif., by Shell Oil Company, Emeryville, Calif., a corporation of Delaware, assignee

No Drawing. Original No. 3,068,268, dated Dec. 11, 1962, Ser. No. 88,648, Feb. 13, 1961. Application for reissue Sept. 24, 1963, Ser. No. 312,825
9 Claims. (Cl. 260—461)

Matter enclosed in heavy brackets [ ] appears in the original patent but forms no part of this reissue specification; matter printed in italics indicates the additions made by reissue.

This invention relates to a process for the preparation of insecticides. More particularly, this invention relates to a process for the preparation of the insecticidally more active isomeric form of certain phosphorus esters.

Neutral esters of acids of pentavalent phosphorus in which one of the ester groups is a vinyl group substituted on the beta carbon atom thereof form a well known general class of insecticides, various subclasses thereof being described in such United States Patents as U.S. Nos. 2,744,128; 2,765,331; 2,788,358; 2,865,944; 2,867,646; 2,891,887; 2,894,014; 2,894,018; 2,895,982; 2,898,341; 2,913,367, and 2,956,073, and in such British patents as No. 783,697. It has been found that in the cases of these compounds wherein the beta carbon atom of the vinyl ester group is mono-substituted, or is di-substituted by two different substituents (i.e., asymmetrically di-substituted), these compounds can exist in the forms of two geometric isomers. This is illustrated in the following schematic diagrams, wherein R represents the phosphorus acid moiety, R′ and R″ each represents hydrogen or an organic group and R° represents an organic group which is different from and larger than R″. Thus:

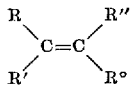

(I)

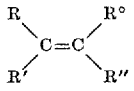

(II)

By "larger" is meant that the group R° is of greater weight than R″. The form wherein the phosphorus acid moiety, R, and the substituent group R° are on the same side of the olefinic double bond (diagram II) will be considered to be the cis form, while the trans form will be considered to be that represented by diagram (I), wherein the phosphorus acid moiety, R, and the substituent group R° are on opposite sides of the olefinic double bond.

The evidence available indicates that the isomer wherein the large groups R and R° are trans to each other is much more insecticidally active than is the corresponding cis isomer.

As shown in the patents already mentioned herein, these compounds ordinarily are prepared by reacting a neutral ester of an acid of trivalent phosphorus with a non-acidic carbonyl compound (that is, a carbonyl compound of the class consisting of aldehydes and ketones) in which the alpha carbon atom is substituted by an atom of halogen and also by the group R°. This method for preparation of these esters can be illustrated by the following general equation, and by the following specific illustration showing preparation of a typical species of these esters. In general terms, the reaction proceeds:

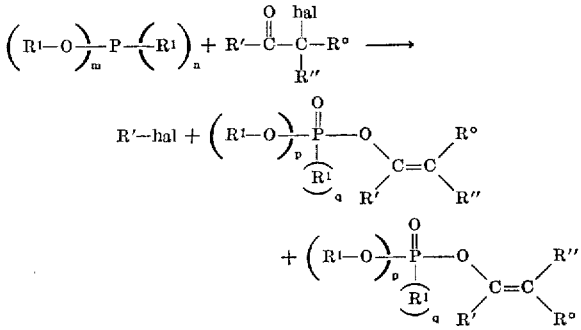

wherein hal is halogen, preferably middle halogen (i.e., bromine or chlorine), R′, R″ and R° have the respective meanings already assigned herein, $R^1$ is organic, m is 1, 2 or 3, m+n=3, p=m−1, and p+q=2. This general reaction is illustrated by the preparation of dimethyl 2-carbomethoxy-1-methylvinyl phosphate by the reaction of trimethyl phosphite with methyl alpha-chloroacetoacetate, viz:

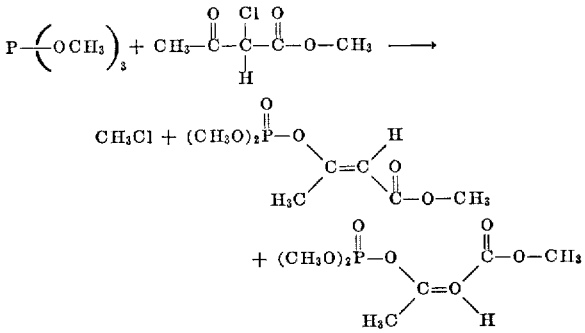

This general reaction, and the manner in which it is conducted is set out in detail in the patents already mentioned herein, U.S. 2,956,073 describing the process in the greatest detail.

It has been found that this method of preparation results in a mixture of the two isomers, usually in the ratio of about 50–60 percent of the more active isomer and 40–50% of the less active isomer. The isomer of higher insecticidal activity is of course preferred, so that a process that results in a product containing a substantially higher content of that isomer would be highly desirable.

Such a process has now been discovered. Briefly, this process comprises reacting a triester of a trivalent acid of phosphorus with a carbonyl compound in which the alpha carbon atom is substituted by an atom of halogen and also by the group R° in the manner heretofore known, but including in the reaction mixture a minor amount of an acidic organic compound. By conducting the reaction in this manner, there is ordinarily effected an increase in the insecticidally active isomer content of the product of the order of 30% or even more, with a corresponding reduction in the amount of the undesired less active isomer. Since suitable organic acidic compounds are readily available at low cost, since but a minor amount of the acid is ordinarily required, and since the presence of the acidic compound does not significantly complicate recovery of the desired product, it is apparent that this new process which has been discovered provides a simple and effective route suitable for the large-scale production of the more insecticidal—that is, the trans isomer—form of these phosphorus esters.

As pointed out in the aforementioned patents, the suitable phosphorus ester reactants are those wherein $R^1$ represents hydrocarbon or substituted hydrocarbon, preferably of low molecular weight, for example containing from 1 to 10 carbon atoms. Preferably, one of the groups $R^1$—O— is alkoxy of from one to four carbon atoms since these compounds react most readily with the halogenated carbonyl compound. Otherwise, the group $R^1$ may be aliphatic, cycloaliphatic, aromatic or of mixed structure. When aliphatic, it may be either straight-chain or branched-chain in configuration. Type-wise, the preferred organic groups include alkyl, cycloalkyl, aryl, alkaryl, and like groups. Illustrative examples include the methyl, ethyl, n- and isopropyl groups, the various isomeric butyl, pentyl, hexyl and octyl groups, the cyclopentyl, cyclohexyl and like cycloalkyl groups, the phenyl group; the naphthyl group, the benzyl, phenethyl, p-methylbenzyl and like aralkyl groups; the isomeric tolyl groups, the isomeric xylyl groups, the ethylphenyl group, the 2,4-dimethyl- and 3,5-dimethylphenyl and like alkaryl groups, and the like.

Where p is 2—that is, in the phosphate insecticides—the two symbols, $R^1$, may together represent a divalent hydrocarbon group, each of the symbols representing one valence bond thereof. In such insecticides, it is preferred that the divalent group be an alkylene group of up to 10 carbon atoms, with 1 to 5—preferably 2 to 3—carbon atoms in the chain thereof which bonds together the indicated oxygen atoms.

The substituted hydrocarbon groups represented by $R^1$ are those of the above-mentioned hydrocarbon groups which are substituted by one or more non-hydrocarbon substituents. The preferred substituents are middle halogen, the nitro group and amine groups represented by the formula:

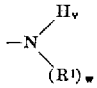

and ether groups, $R^1$—O—, and wherein $R^1$ has the meaning already set out herein, v is 1 or 2, and v+w=2.

Illustrative examples of the non-hydrocarbon groups include monohaloalkyl groups, such as the chloromethyl and bromomethyl groups, the 2-chloroethyl, 1-bromopropyl, 3-chloropropyl and the like; polyhaloalkyl groups, such as the dichloromethyl, tribromomethyl, 1,2-dichloroethyl, 2,2-dibromoethyl, 3,3 - dichloro - 2 - bromopropyl groups, and the like; nitroalkyl groups such as the 2-nitroethyl group, halo-substituted aromatic groups such as the various isomeric chloro- and bromophenyl groups, the various isomeric polyhalophenyl groups, such as the 2,6-dichlorophenyl group, the 3,5-dibromophenyl group and the like; amino-substituted groups, such as the 2-aminoethyl group, the 2-dimethylaminoethyl group and the like; the aniline group; the p-dimethylaminophenyl group; the p-ethylaminobenzyl group and the like.

Of particular interest because of the high insecticidal activity of the insecticides made from them are the phosphites (m=3) wherein each $R^1$ is lower hydrocarbon—particularly alkyl of up to seven carbon atoms, aryl of up to ten carbon atoms or aralkyl of up to 10 carbon atoms, particularly the phenyl or benzyl group.

The group R° can be [halogen, preferably middle halogen] one of the groups represented by $R^1$, or it can be a functional organic group, such as an aliphaticoxycarbonyl group, particularly a carboalkoxy or an alkoxyalkyleneoxycarbonyl group of up to ten carbon atoms; it may represent an ether group, $R^1$—O—, wherein $R^1$ has the meaning already set out; it may represent an acyloxyalkoxycarbonyl group wherein the acyl group is

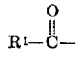

or a sulfur analog thereof, or it may represent an amide group having the amino moiety set out above.

The groups represented by each of R′ and R″ suitably can be one of those represented by $R^1$ and R°, or either or both of R′ and R″ can be hydrogen [, or R″ can be halogen, preferably middle halogen].

The preferred organic groups represented by the symbol R° are those having the formula —X—$R^3$,

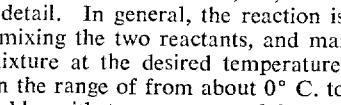

wherein X represents oxygen or sulfur, *alk. is alkyl of 1 to 4 carbon atoms* and $R^1$ has the meaning already set out herein. Of most importance from the standpoint of the insecticidal activity of the phosphorus esters prepared from them are those wherein R° represents a carboalkoxy group of up to six carbon atoms, an aralkyloxycarbonyl group of up to ten carbon atoms, or [an] [aminocarbonyl] *a dialkylaminocarbonyl* group of up to ten carbon atoms, and R″ is hydrogen.

The manner in which the reaction between the phosphorus ester and the halogen-substituted carbonyl compound is carried out is clearly described in the art—for example, U.S. Patent No. 2,956,073 described the process in detail. In general, the reaction is carried out by simply mixing the two reactants, and maintaining the reaction mixture at the desired temperature. Temperatures within the range of from about 0° C. to about 150° C. are suitable, with temperatures of from about 10° C. to about 110° C. usually being preferred. About stoichiometric proportions of the reactants are generally used, although an excess—up to 100%, for example—can sometimes be used to advantage. Inert diluents can be used to moderate the reaction, or to render the reaction mixture readily fluid. Evolved halide—$R^1$-hal—the byproduct, desirably is removed from the reaction as it is formed, as by conducting the reaction mixture at a temperature at which the halide is a gas, and removing it from the reaction zone as it forms. Workup of the final reaction mixture is conventional, details being given in U.S. Patent No. 2,956,073.

According to the present invention, the reaction is conducted in an identical manner to that taught by the art, with the exception that the reaction is carried out in the presence of an acidic organic compound. From the available data, it appears that the suitable acidic materials are those having ionization constant of at least $1\times10^{-10}$. The acidic compound used should, of course, be one which is substantially inert with respect to the other components of the reaction mixture, to avoid undesirable side reactions. For this reason it is desirable to avoid the use of very strong organic acids—that is, acids having an ionization constant greater than $10^{-2}$. Also for this reason, the acidic compound used—in particular the aliphatic acids—should not be substituted by other than hydrocarbon or oxygen-containing substituents, and should be free from olefinic or acetylenic unsaturation. Suitable preferred acidic compounds thus include the alkane, hydroxyalkane, alkoxyalkane mono- and polycarboxylic acids, including those of branched-chain as well as of straight-chain configuration, cycloalkane mono- and poly-carboxylic acids, aromatic mono- and poly-carboxylic acids, mono- and poly-carboxylic acids of mixed configuration, as in the alkaryl acids, aralkyl acids and the like; the corresponding sulfur acids, such as the sulfonic and sulfinic acids; the corresponding sulfamic acids, and the like, and the corresponding phenols and thiophenols. In acids containing an aromatic moiety or moieties, and in the phenols, the aromatic nucleus or nuclei can be substituted by such non-hydrocarbon substituents as halogen, the nitro group, the cyano group, the hydroxy group, alkoxy groups, amino groups and the like. Suitable specific acidic materials thus include formic acid, acetic acid, propionic acid, n- and iso-butyric acids, and other alkanoic acids; glycolic, lactic, methoxyacetic, and like substituted alkanoic acids; malonic, adipic, cyclohexane-1,1-dicarboxylic, glutaric, malic, oxalic, pimelic, succinic and like alkane and cycloalkane polycarboxylic acids; benzoic acid, the isomeric methoxybenzoic acids, the isomeric mono-, di- and tri-chloro- and bromo-benzoic acids, the toluic acids, the phthalic acids, and like aryl and alkaryl acids; phenylacetic acid, halo-phenylacetic acids, alkylphenylacetic acids, phenylpropionic acid, alkoxy-substituted-phenylacetic acids, and like aralkyl acids, phenol, cresols, salicylic acid, the bromo-cresols, and the like. Because of their physical properties, the lower molecular weight acids and the phenols—for example, those acids and phenols containing not more than 10 carbon atoms—are preferred, the alkanoic acids of up to six carbon atoms having the most desirable properties. For the sake of brevity the acidic compound, whether acid or phenol or other, will hereinafter be referred to as the acid.

It is ordinarily necessary to employ at least about 0.005 mole of the acid per mole of the halo-carbonyl reactant, and preferably at least about 0.05 mole of the acid per mole of the halo-carbonyl reactant is employed. Not more than about 1.5 moles of acid per mole of the halo-carbonyl reactant should be employed, because larger quantities of the acid tend to promote undesirable side reactions. As a general rule, maximum formation of the trans isomer is effected, yet undeseirable side reactions are avoided, by employing from about 0.1 to about 1.3 moles of acid per mole of the halo-carbonyl reactant.

It is desirable that the acid be present from the outset of the reaction. The reactants and the acid can all be mixed simultaneously; however, because of the exothermic nature of the reaction, such a technique may not be useful on a large scale. In such a case, it is desirable to mix the acid with one reactant, then add the other reactant at such a rate that the reaction temperature can be controlled as desired. From the experimental data obtained it appears preferable to mix the acid with the halocarbonyl compound, and then gradually commingle the phosphorus ester with that mixture, as by slowly introducing the ester into the stirred mixture.

It has been found that an equimolar amount or a moderate excess of the phosphorus ester can be used—an excess of from about 5% to about 50% being suitable in most cases.

The manner in which the phosphorus ester product is recovered from the reaction mixture will depend upon the physical characteristics of the acid used, whether a solvent was used, and upon like factors. Where the volatility of the acid permits, distillation techniques are entirely suitable. Otherwise, solvent extraction, followed by distillation, crystallization or other procedures, can be used.

The following examples will illustrate the efficacy of the improvement provided by this invention for producing higher yields of the insecticidal trans isomers of the substituted vinyl esters of phosphorus acids.

EXAMPLE I

Preparation of dimethyl-2-(p-nitrobenzyloxycarbonyl)-1-methylvinyl phosphate To 45.1 grams of p-nitrobenzyl alpha-chloroacteoacetate was added 5 grams of glacial acetic acid. 26 grams of trimethyl phosphite was then added at 70–77° C. over a period of 20 minutes. The reaction mixture then was heated in 15 minutes to 100° C., and held for 36 minutes at 100° C. The mixture then was stripped to a kettle temperature of 102° C. at 0.6 millimeter mercury pressure. The product (59 grams) contained approximately 73% of the trans isomer of dimethyl 2-(p-nitrobenzyloxycarbonyl)-1-methylvinyl phosphate.

Preparation of dimethyl 2-(p-nitrobenzyloxycarbonyl)-1-methylvinyl phosphate by this procedure, except that no acetic acid is employed, ordinarily results in a product containing about 50% of the trans isomer.

EXAMPLE II

Preparation of dimethyl 2-(dimethylcarbamoyl)-1-methylvinyl phosphate 770 grams of 2-chloro-N,N-dimethylacetoacetamide were mixed with 100 milliliters of glacial acetic acid at 90–95° C. and 656 grams of trimethyl phosphite was added to the constantly stirred mixture over a period of 1.25 hours. The temperature of the mixture was held at 100° C. during the addition and for an additional 2.75 hours. The mixture then was stripped to a kettle temperature of 110° C. at 1.8 millimeters mercury pressure. There was obtained 1044 grams of product, which contained 82% of the trans isomer of dimethyl 2-(dimethylcarbamoyl)-1-methylvinyl phosphate.

Conduct of the same procedure, but omitting the acetic acid, ordinarily has resulted in a product containing about 50% of the trans isomer.

EXAMPLE III

Preparation of dimethyl 2-(alpha-methylbenzyloxy carbonyl)-1-methylvinyl phosphate A solution of 20 grams of alpha-methylbenzyl alpha-2-chloroacetoacetate, 3 milliliters of glacial acetic acid and 13.65 grams of trimethyl phosphite was allowed to warm spontaneously to 50° C., then heated for 4.25 hours at 95–102° C. The resulting mixture then was stripped to a kettle temperature of 110° C., at 0.35 millimeter mercury pressure to yield 26 grams of product. Infrared spectrum analysis showed that the product was 83% trans-isomer of dimethyl-2-(alpha-methylbenzyloxycarbonyl)-1-methylvinyl phosphate. Repetition of this procedure, employing one-third of this concentration of acetic acid relative to the acetate employed, resulted in a product containing 80% trans isomer.

This experiment was repeated, employing equivalent amounts of several other acidic organic materials. These materials, and the trans isomer content of the product obtained were as follows:

| Acidic material— | Trans isomer content of product, percent |
|---|---|
| Benzoic acid | 65 |
| Phenol | 71 |
| Formic acid | 71 |
| Trimethylacetic acid | 80 |

This experiment was again repeated employing in addition hexane as a solvent. The product contained 77% trans isomer.

It will be evident from the foregoing experimental results that the improvement of this invention results in a marked increase in the amount of the more insecticidal trans isomer which can be produced from given amounts of each of the starting materials.

EXAMPLE IV

(a) Preparation of dimethyl 2-methoxycarbonyl-1-methylvinyl phosphate

A mixture containing 136 grams of methyl 2-chloroacetoacetate and 30 grams of glacial acetic acid was stirred at 80° C. while 136 grams of trimethyl phosphite was added over a period of 30 minutes. After the addition was complete, the solution was stirred at 80° C. for an additional 2 hours and then was stripped on a rotating evaporator at 100° C. at 1 millimeter mercury pressure. 202 grams of product were obtained. Analysis showed that the product contained 79% of the trans isomer of dimethyl 2-methoxycarbonyl-1-methylvinyl phosphate.

(b) Preparation of dimethyl 2-methoxycarbonyl-1-methylvinyl phosphate

To a solution of 20 milliliters of methyl 2-chloroacetoacetate in 100 milliliters of acetonitrile containing 10 milliliters of acetic acid was added 20 milliliters of trimethyl phosphite at 80° C. over a period of about 20 minutes. After an additional period of 2 hours at 80° C., the solution was stripped at 60° C. at 0.1 millimeter mercury pressure to give 40 grams of a colorless liquid. The yield of trans isomer of dimethyl 2-methoxycarbonyl-1-methylvinyl phosphate was found by analysis to be 75%.

(c) When the reaction of trimethyl phosphate with 2-chloroacetoacetate is conducted under these same conditions but in the absence of acetic acid, the product ordinarily contains but about 60% of the trans isomer of dimethyl 2-carbomethoxy-1-methylvinyl phosphate.

We claim as our invention:

1. In a process for preparing dimethyl 2-(alpha-methylbenzyloxycarbonyl)-1-methylvinyl phosphate by the reaction of trimethyl phosphite with alpha-methylbenzyl alpha-2-chloroacetoacetate, the improvement which comprises conducting the reaction in the presence of a minor amount of a lower alkanoic acid.

2. In a process for preparing dimethyl 2-(alpha-methylbenzyloxycarbonyl)-1-methylvinyl phosphate by the reaction of trimethyl phosphite with alpha-methylbenzyl alpha-2-chloroacetoacetate, the improvement which comprises conducting the reaction in the presence of a minor amount of acetic acid.

3. In a process for preparing dimethyl 2-methoxycarbonyl-1-methylvinyl phosphate by the reaction of trimethyl phosphite with methyl 2-chloroacetoacetate, the improvement which comprises conducting the reaction in the presence of a minor amount of a lower alkanoic acid.

4. In a process for preparing dimethyl 2-methoxycarbonyl-1-methylvinyl phosphate by the reaction of trimethyl phosphite with methyl 2-chloroacetoacetate, the improvement which comprises conducting the reaction in the presence of a minor amount of acetic acid.

5. In a process for preparing dimethyl 2-(dimethylcarbamoyl)-1-methylvinyl phosphate by the reaction of trimethyl phosphite with 2-chloro-N,N-dimethylacetoacetamide, the improvement which comprises conducting the reaction in the presence of a minor amount of acetic acid.

6. In a process which involves the reaction:

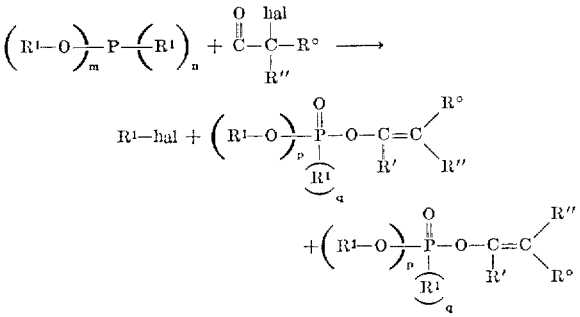

wherein m is an integer from 1 to 3, m+n=3, p=m−1, p+q=2, "hal" is middle halogen, $R^1$ is an organic radical containing up to 10 carbon atoms of the group consisting of alkyl, cycloalkyl, aryl, alkaryl and aralkyl radicals and such radicals substituted by from one to a plurality of substituents of the group consisting of middle halogen, nitro, amino of the formula $—N(H)_v(R^1)_w$ and ether of the formula $R^1$—O—, with the proviso that in at least one of $R^1$—O— in the reactant of the formula $(R^1—O)_mP(R^1)_n$, $R^1$ is lower alkyl, R′ is a member of the group consisting of hydrogen and organic radicals represented by $R^1$, R″ is a member of the group consisting of hydrogen [middle halogen] and organic radicals represented by $R^1$, and R° is a member of the group consisting of [middle halogen,] organic radicals represented by $R^1$, and functional radicals of up to 10 carbon atoms of the group consisting of carboalkoxy, ether of the formula $R^1$—O—, alkyleneoxycarbonyl, acyloxyalkoxycarbonyl wherein the acyl moiety has the formula $R^1$—C(O)—, aralkyloxycarbonyl, amido of the formula $—C(O)—N[(H)_v(R^1)_w]$ $(alk.)_2$, *wherin alk. is alkyl of 1 to 4 carbon atoms,* and the sulfur analogs of these radicals, with the proviso that R° is different from and of higher molecular weight than R″, the improvement which comprises conducting the said reaction in the presence of a minor amount of an acidic compound free from olefinic and acetylenic unsaturation and of the group consisting of phenols, thiophenols, aliphatic and cycloaliphatic acids unsubstituted by other than hydrocarbon and oxygen-containing substituents, unsubstituted aromatic acids, unsubstituted alkaryl acids, unsubstituted aralkyl acids, such acids wherein the aromatic moiety is substituted by from one to a plurality of substituents of the group consisting of halogen, nitro, cyano, hydroxy, alkoxy and amino of the formula $—N(H)_v(R^1)_w$, with the proviso that v is an integer from 1 to 2 and v+w=2.

7. The improvement according to claim 6 wherein the acidic compound is a lower alkanoic acid.

8. The improvement according to claim 6 wherein the acidic compound is acetic acid.

9. The improvement according to claim 6 applied to the preparation of dimethyl 2-methoxycarbonyl-1-methylvinyl phosphate by the reaction of trimethyl phosphite with methyl 2-chloroacetoacetate.

References Cited by the Examiner

The following references, cited by the Examiner, are of record in the patented file of this patent or the original patent.

UNITED STATES PATENTS

| | | | |
|---|---|---|---|
| 2,865,944 | 12/58 | Stiles et al. | 260—461 |
| 2,894,014 | 7/59 | Stiles et al. | 260—461 |

CHARLES B. PARKER, *Primary Examiner.*